(12) United States Patent
Chang

(10) Patent No.: US 6,318,517 B1
(45) Date of Patent: Nov. 20, 2001

(54) MECHANISM FOR EFFECTING RESISTANCE

(76) Inventor: Huang-Tung Chang, P.O. Box 23-487, Changhua City 500 (TW)

( * ) Notice: Subject to any disclaimer, the term of this patent is extended or adjusted under 35 U.S.C. 154(b) by 0 days.

(21) Appl. No.: 09/502,051

(22) Filed: Feb. 11, 2000

(51) Int. Cl.⁷ .................................................. B60L 7/00
(52) U.S. Cl. ................. 188/161; 188/164; 188/267; 482/63; 482/903
(58) Field of Search ..................... 188/161, 163, 188/164, 158, 159, 160, 267; 192/84.5; 242/288; 482/5, 6, 57, 63, 92, 903

(56) References Cited

U.S. PATENT DOCUMENTS

| | | | |
|---|---|---|---|
| 5,072,930 | * 12/1991 | Sun | 272/73 |
| 5,236,069 | * 8/1993 | Peng | 188/267 |
| 5,437,353 | * 8/1995 | Wu | 188/164 |
| 5,711,404 | * 1/1998 | Lee | 188/164 |

* cited by examiner

*Primary Examiner*—Pam Rodriguez (57) ABSTRACT

A mechanism is designed to effect a resistance and is formed of a support frame on which a braking wheel, an excited magnetic disk and an excited magnetic coil are mounted by a fastening shaft. The excited magnetic disk has an induction surface and a shaft seat over which the excited magnetic coil is fitted. The induction surface of the excited magnetic disk is provided along the fringe thereof with a plurality of magnetic poles serving as eddy current induction areas at the time when the excited magnetic disk and the braking wheel interact. The eddy current and the magnetic flux interact to effect a reverse rotation moment opposite in direction to the rotation of the braking wheel.

1 Claim, 7 Drawing Sheets

MECHANISM FOR EFFECTING RESISTANCE

FIELD OF THE INVENTION

The present invention relates to a mechanism for effecting a resistance force against an electrically-conductive body in motion.

BACKGROUND OF THE INVENTION

Figure 1:
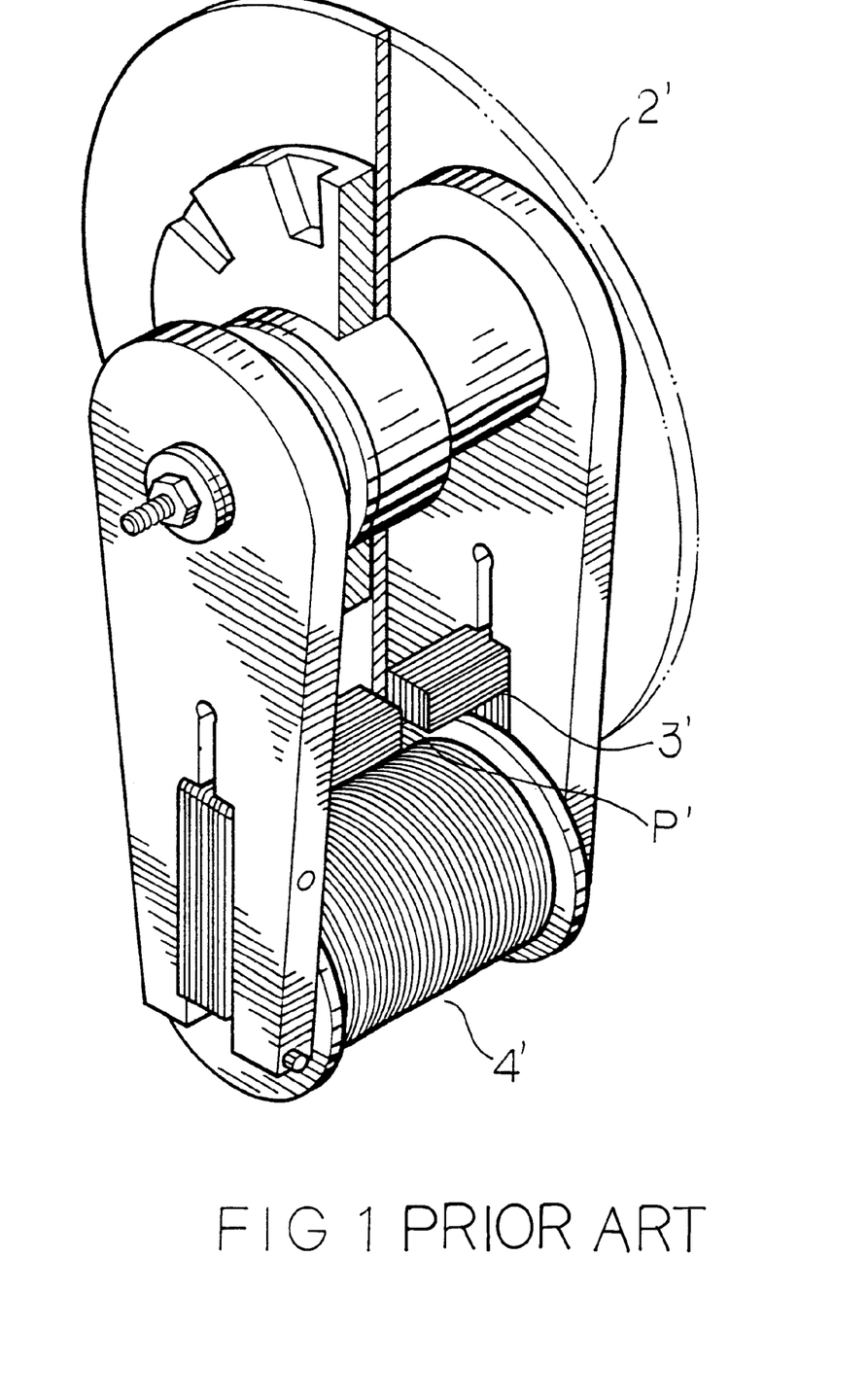
FIG. 1 shows a side sectional view of a prior art structure.

The conventional mechanisms for effecting a resistance are generally attained by means of mechanical friction, oil pressure, vortex, electrical machine, etc. The friction resistance device is incapable of controlling the magnitude of resistance with precision and is unstable because of the problems of wear and load. The oil pressure resistance device has problems of oil leakage, noise, and load reduction. The electrical machine resistance device is complicated in construction and very expensive. The vortex resistance device makes use of a permanent magnet as a magnetic field source, or an electromagnetic coil as a magnetic field source. The permanent magnet resistance device is defective in design in that it can not be easily connected with an external communication signal for controlling the magnitude of the resistance force. The electromagnetic coil resistance device can be connected with the external digital or analog signal for controlling the magnitude of the magnetic field resistance. As shown in FIG. 1, the electromagnetic coil resistance device comprises an electromagnetic coil 4' winding around a U-shaped electromagnetic core 3', which is provided with a space P' for receiving the wheel rim of the braking wheel 2'. When the coil is provided with power, the current passes the coil to form a magnetic field. The magnetic flux is brought about on the iron core 3'. In the meantime, the rim of the braking wheel 2' passes the space P' of the opening of the iron core 3', the eddy current is brought about such that the eddy current forms a resistance of reverse rotation moment as a load to the braking wheel 2'. The electromagnetic coil structure is defective in design in that the point of application force of an entire resistance force is smaller to reach only the small area of the space P' of the opening of the U-shaped iron core, and that its magnetic loop structure tends to bring about the magnetic leakage, which results in an ineffective control of resistance exerting on the braking wheel.

SUMMARY OF THE INVENTION

The primary objective of the present invention is to provide a mechanism for effecting resistance, which is free from the drawbacks of the prior art resistance device using the electromagnetic coil as a source of the magnetic field.

The mechanism of the present invention effects a resistance having a relatively greater application surface reaching the annular area of the entire braking wheel surface. The magnetic loop of the present invention is not susceptible to the magnetic leakage. As a result, the current input is effectively used to bring about the stable magnetic flux. In view of the interaction area of the magnetic flux and the eddy current induced by the rotation of the braking wheel being relatively greater, the entire braking wheel can be effectively controlled by the rotation moment which is so brought about by the eddy current. As a result, the magnitude of resistance can be precisely controlled by the magnitude of the current input.

The resistance mechanism of the present invention comprises a fastening shaft by means of which a braking wheel, an excited magnetic disk, and an excited magnetic coil are mounted on a support frame. The excited magnetic disk and the braking wheel are made of a material conductive to magnetism. The excited magnetic disk is provided in the annular area along the fringe of the upper side thereof with a wavy gap of N/S pole, which is provided with the magnetic poles thicker or higher than the remaining portion (magnetic path). As the electric current is made available to the mechanism of the present invention, the thickened portion of the annular area of the excited magnetic disk becomes a magnetic pole, which serves as an eddy current induction area.

The braking wheel of the present invention is disposed on the outer side of the disk surface of the excited magnetic disk such that the surface of the braking wheel is opposite to the disk surface of the excited magnetic disk, and that the surface of the braking wheel is separated from the disk surface of the excited magnetic disk by a predetermined distance. As the electric current is made available, the surrounding area of the coil forms a magnetic field. In the meantime, a magnetic flux is brought about on the excited magnetic disk so as to enable the thickened portion to become the magnetic poles. A magnetic loop is thus formed by the magnetic line expanding toward the internal magnetic path, the external magnetic path, the magnetic poles, and the braking wheel. When the braking wheel is driven by a motor or external force, the eddy current is induced in the eddy current induction area of the excited magnetic disk. In view of the interaction between the eddy current and the magnetic flux, a reverse rotation moment is thus brought about such that the reverse rotation moment is opposite in direction to the rotation of the braking wheel. As a result, the reverse rotation moment acts as a resistance against the braking wheel in its entirety. In other words, the braking wheel and the entire periphery of the braking wheel are effectively controlled by the rotation moment effected by the mechanism of the present invention.

The foregoing objective, features, functions, and advantages of the present invention will be more readily understood upon a thoughtful deliberation of the following detailed description of a preferred embodiment of the present invention with reference to the accompanying drawings.

DETAILED DESCRIPTION OF THE PREFERRED EMBODIMENT

Figure 5:
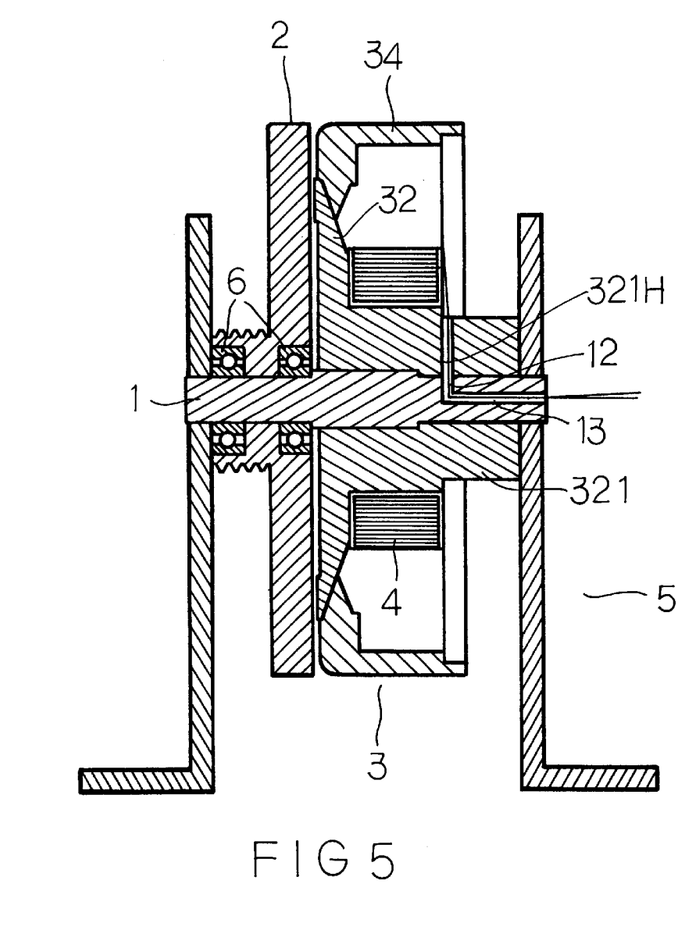
FIG. 5 shows a side sectional view of the preferred embodiment of the present invention.
Figure 6:
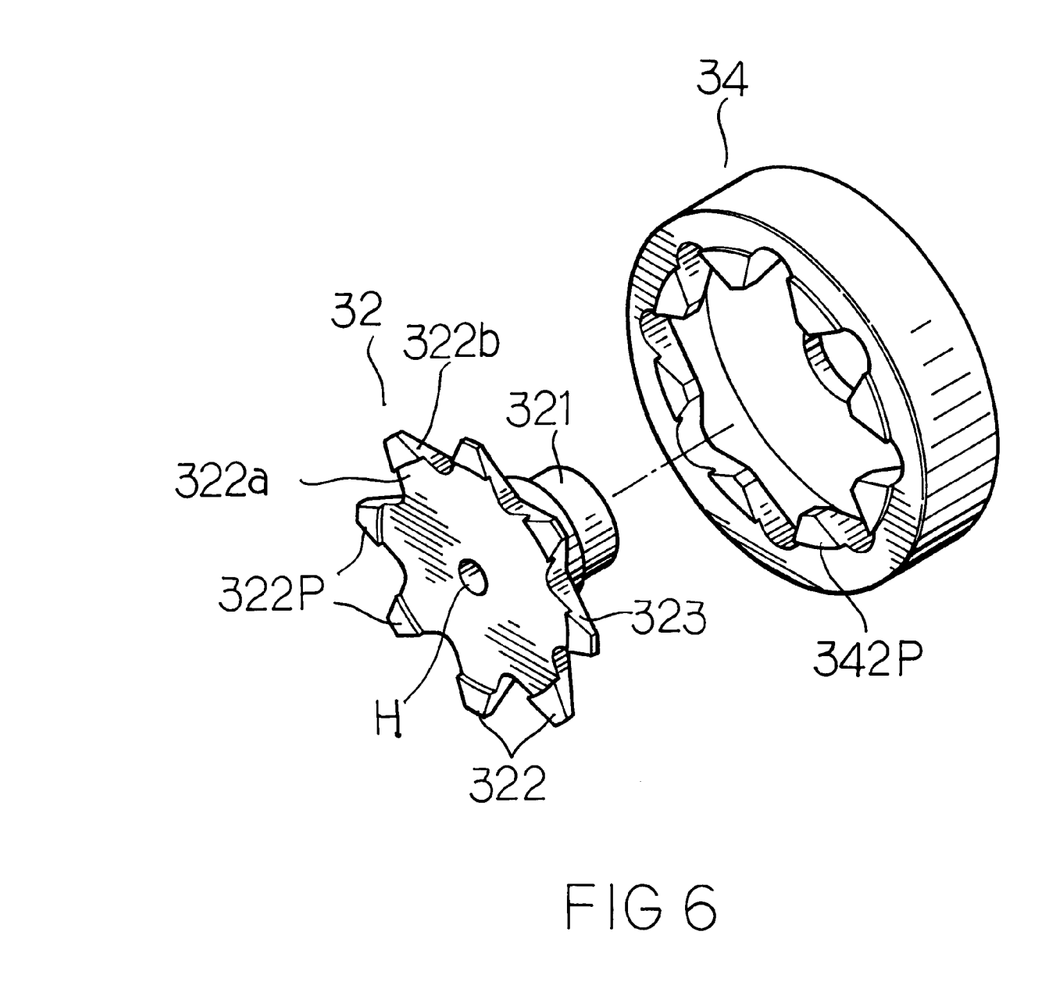
FIG. 6 shows a schematic perspective view of the preferred embodiment of the present invention.

As shown in FIGS. 2–7, the mechanism embodied in the present invention is applied to the wheel resistance control device of an exercise machine and is formed of a braking wheel 2, an excited magnetic disk 3, and an excited magnetic coil 4, which are mounted on a support frame 5 by a fastening shaft 1. The excited magnetic disk 3 is formed of an internal excited magnetic disk 32 and an external excited magnetic disk 34. The excited magnetic coil 4 is mounted on a shaft seat 321 of the excited magnetic disk 3. As shown in FIG. 6, the internal excited magnetic disk 32 has a radiate wing-shaped disk surface portion and a shaft seat 321 portion, which are connected with each other. A plurality of radiate wing pieces 322 are extended outward from a center which is the connection portion of the disk surface portion and the shaft seat portion 321. Each of the wing pieces 322 has an outer side 322a and an inner side 322b narrower than the outer side 322a. In other words, each wing piece 322 has a width which becomes gradually narrower toward the inner side 322b from the outer side 322a, thereby resulting in the formation of a bevel 323 in two ends of the wing piece 322. Each wing piece 322 is provided at the tail end of the outer side 322a thereof with a thickened portion 322p (magnetic pole) serving as an induction area. The bevel 323 is used as a current guiding surface of the mechanism in operation. The shaft seat 321 is of a cylindrical construction and is provided at the center thereof with an axial hole H in which the fastening shaft 1 is received such that the fastening shaft 1 fastens other component parts on the support frame 5. The external excited magnetic disk 34 has a hollow toothed ring in which the internal excited magnetic disk 32 is received such that the disk surface wing piece portion of the internal excited magnetic disk 32 is engaged with the round tooth, with a gap remaining therebetween. The pointed end of the round tooth of the external excited magnetic disk is provided with a thickened portion serving as an induction area. As shown is FIG. 4, the internal excited magnetic disk 32 and the external excited magnetic disk 34 are joined together such that the disk surface is provided with a wavy gap S of N/S pole. The thickened areas 322P and 342P are located at two sides of the wavy gap S of N/S pole, or the annular position of the fringe of the disk surface. As the electric current is made available, the thickened portions at the annular position become magnetic poles 322P and 342P, which are the eddy current induction areas at the time when the excited magnetic disk 3 and the braking wheel 2 interact. The excited magnetic coil 4 is provided with N circles of wires and is fitted over the shaft seat 321.

Figure 2:
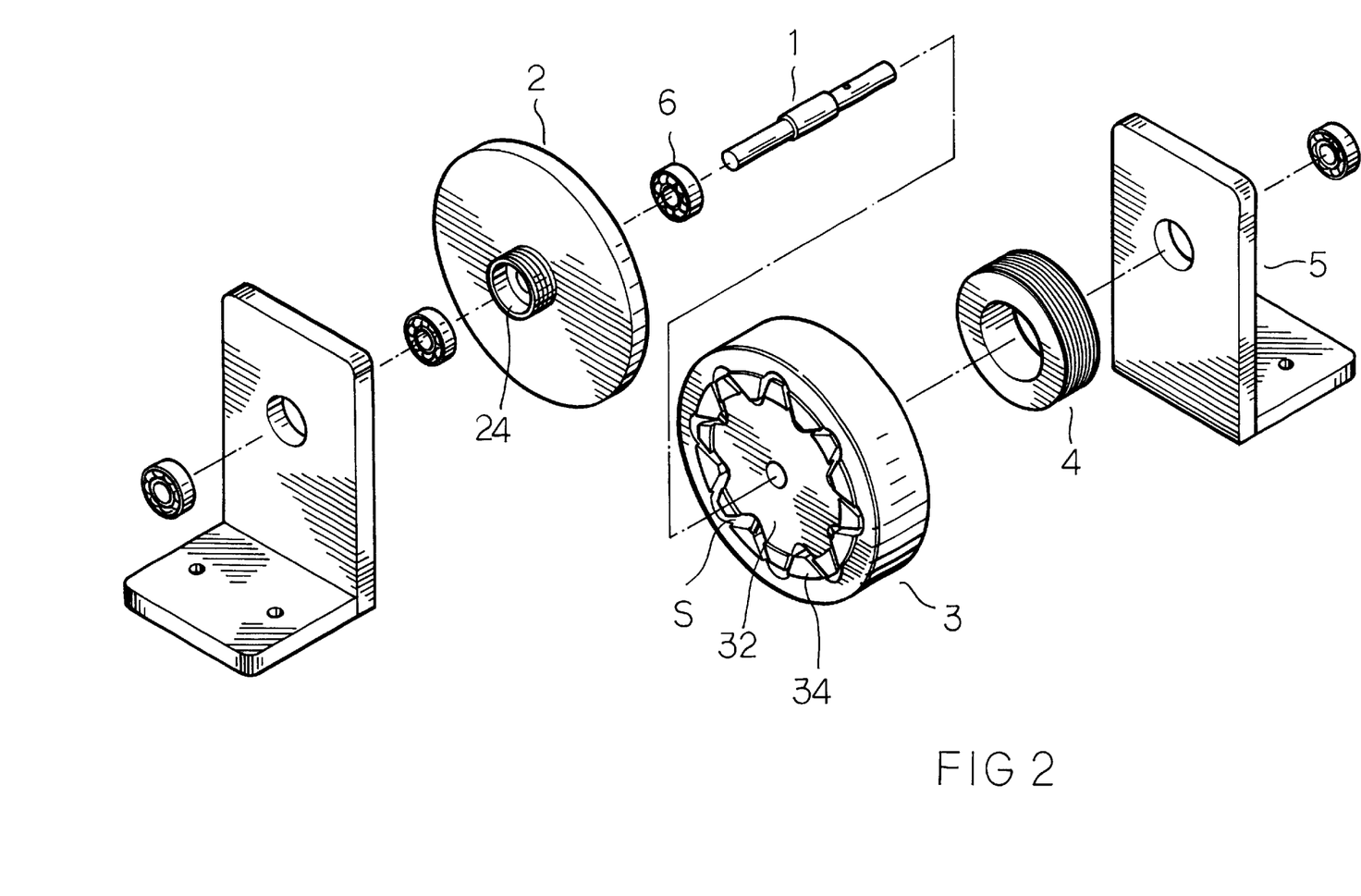
FIG. 2 shows an exploded view of the preferred embodiment of the present invention.
Figure 3:
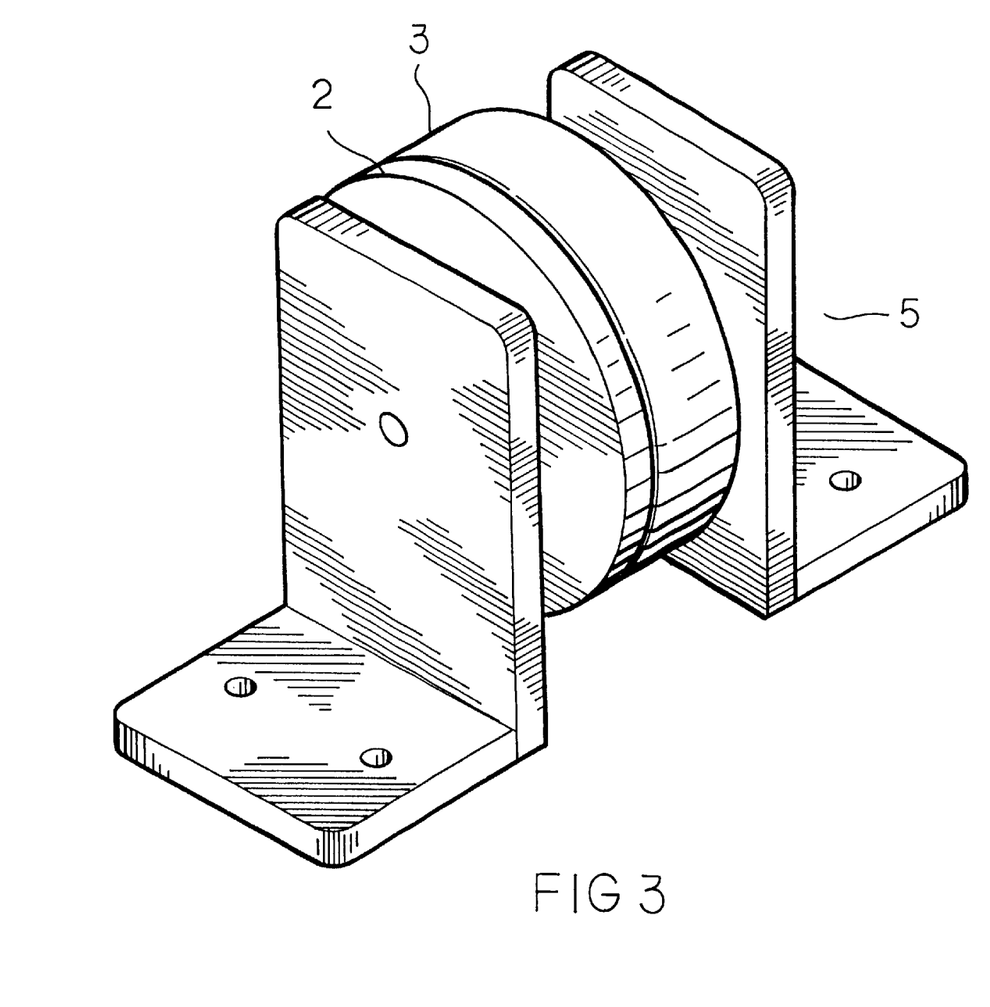
FIG. 3 shows a schematic perspective view of the excited magnetic disk of the preferred embodiment of the present invention.
Figure 4:
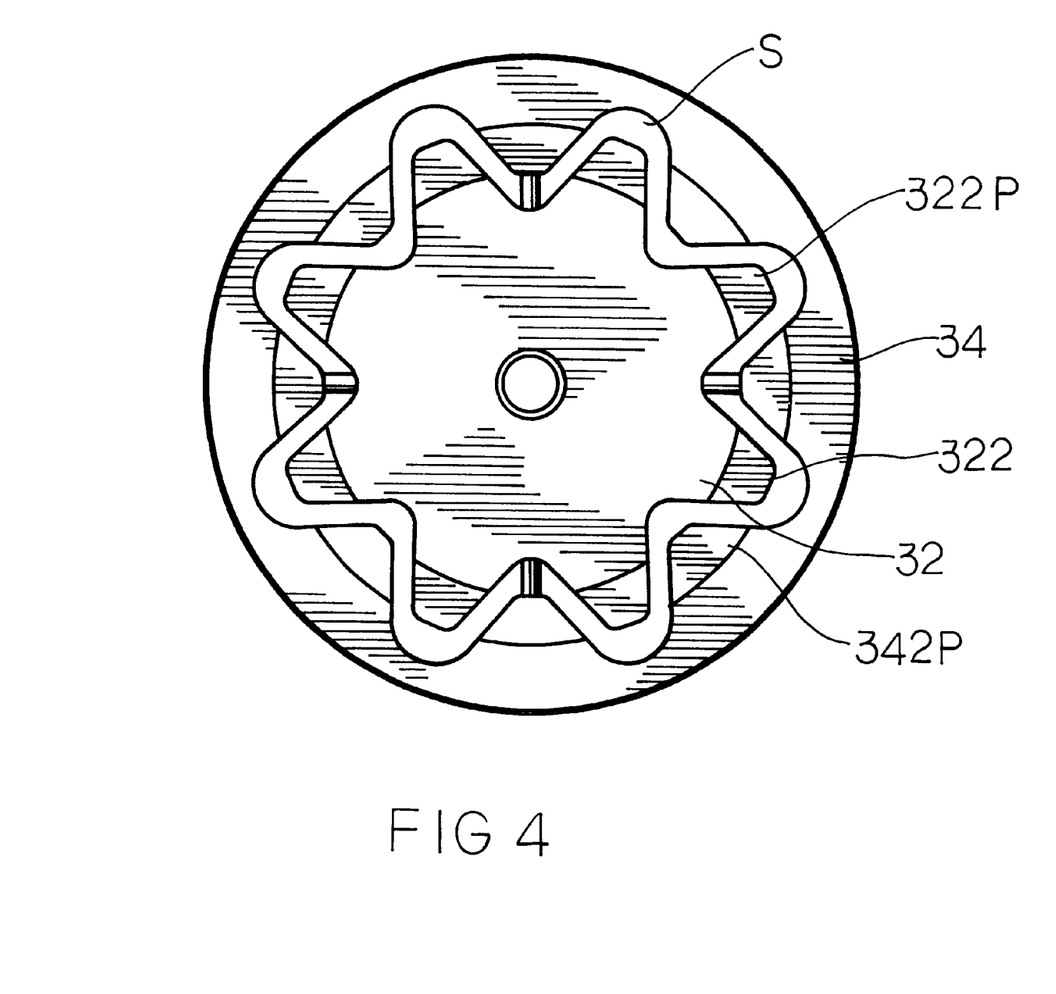
FIG. 4 shows a plan view of the surface of the excited magnetic disk of the preferred embodiment of the present invention.

As shown in FIGS. 2 and 5, a braking wheel 2 is located at the outer side of the induction area of the excited magnetic disk 3. The braking wheel 2 is provided at the center thereof with a wheel hole 24 which is provided therein with a bearing 6 in which the fastening shaft 1 is received for mounting other component parts on the support frame 5. The excited magnetic disk 3 and the excited magnetic coil 4 are fixed. The braking wheel 2 is capable of radial rotation in view of the bearing 6. The fastening shaft 1 is provided along the center line thereof with a through hole 13. The fastening shaft 1, the internal excited magnetic disk shaft seat 321 and the excited magnetic coil 4 are provided therebetween with a wire hole 12, 321H for the electric wire to pass therethrough. As a result, the electric wire of the excited magnetic coil 4 is put into the through hole 13 of the fastening shaft 1 via the wire hole such that the electric wire is jutted out of the fastening shaft to become connected with a power source.

The excited magnetic disk 3 is disposed in one side of the braking wheel 2 such that the disk surface of the excited magnetic disk is separated from the surface of the braking wheel by an appropriate air gap. When the electric current is made available to the coil 4, a magnetic field is induced around the coil 4. In the meantime, the magnetic flux is brought about on the excited magnetic disk 3, thereby enabling each wing piece tail end 322P of the internal excited magnetic disk and the thickened portion 342P (induction area) of the pointed end of each round tooth of the external excited magnetic disk 3 to become a magnetic pole. As a result, a magnetic loop is formed by the magnetic line extending from the excited magnetic coil to the inner magnetic path, the outer magnetic path, the magnetic pole, and the braking wheel. When the braking wheel 2 is actuated by a motor or external force to turn, the eddy current induction areas 322P and 342P of the excited magnetic disk are induced to bring about the eddy current, which interacts with the magnetic flux to produce a reverse rotation moment opposite in direction to the rotation of the braking wheel 2.

Figure 7:
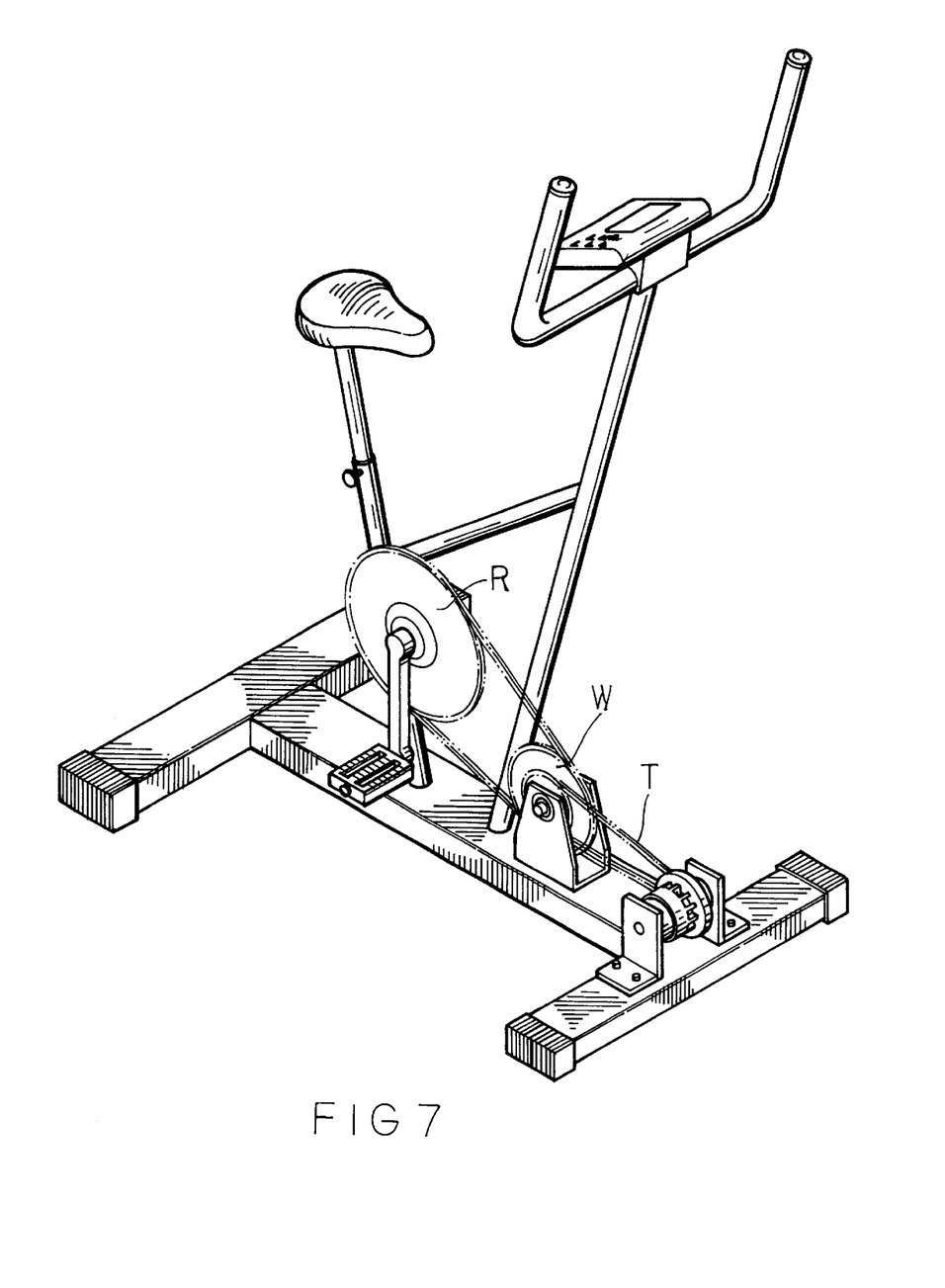
FIG. 7 shows a schematic view of the preferred embodiment of the present invention at work.

Now referring to FIGS. 6 and 7, the mechanism of the preferred embodiment of the present invention is shown to apply to an exercise bike machine such that the braking wheel 2 of the mechanism of the present invention is linked with an intermediate wheel W by a transmission belt T (or chain). The intermediate wheel W is in turn linked with a pedal wheel R of the exercise bike. The resistance force effected by the mechanism of the present invention is transmitted from the braking wheel 2 to the intermediate wheel W and then to the pedal wheel R of the exercise bike. The mechanism of the present invention is optionally provided with a power control mechanism for regulating digitally the magnitude of the current input so as to control the magnitude of the resistance output.

The embodiment of the present invention described above is to be regarded in all aspects as being merely illustrative and not restrictive. Accordingly, the present invention may be embodied in other specific forms without deviating from the spirit thereof. The present invention is therefore to be limited only by the scopes of the following appended claims.

What is claimed is:

1. A mechanism for effecting a resistance, said mechanism comprising a support frame on which a braking wheel, an excited magnetic disk and an excited magnetic coil are mounted by a fastening shaft, said excited magnetic disk being provided along an annular area of the fringe of the disk surface thereof with a wavy gap of north/south pole, said excited magnetic disk having two sides which are thickened more than the remaining portions of said excited magnetic disk, the thickened portions having an outer side and an inner side narrower than said outer side, said thickened portions further having at both ends thereof a bevel, said braking wheel being located at an outer side of the disk surface of said excited magnetic disk such that the wheel surface of said braking wheel is opposite to the disk surface of said excited magnetic disk, and that the wheel surface of said braking wheel is separated from the disk surface of said excited magnetic disk by an air gap, said thickened portions becoming magnetic poles at the time when said excited magnetic disk is provided with electric current, said thickened portions serving as eddy current induction areas at the time when said braking wheel interacts with said excited magnetic disk; wherein said braking wheel is provided at the center thereof with a wheel hole and a bearing which is received in said wheel hole; wherein said excited magnetic disk and said excited magnetic coil are mounted on said fastening shaft whereby said fastening shaft is received in said bearing, said excited magnetic disk and said excited magnetic coil being fixed, said braking wheel being capable of a radial rotation, said excited magnetic disk provided with a shaft seat, said excited magnetic coil being fitted over said shaft seat; wherein said fastening shaft is provided along the center line thereof with a through hole, said fastening shaft, said shaft seat and said excited magnetic coil being provided at a connection portion thereof with a wire hole, via said wire hole the electric wire of said excited magnetic coil is put into said through hole of said fastening shaft so as to connect with an external power source; wherein said excited magnetic disk is formed of an internal excited magnetic disk and an external excited magnetic disk, said internal excited magnetic disk having a radiate wing-shaped disk surface portion and a shaft seat portion connected with said disk surface portion such that a plurality of radiate wing pieces are extended from the connection portion of said shaft seat portion and said disk surface portion, with each of said wing pieces forming said outer side and said inner side narrower than said outer side, each of said wing pieces being provided at two opposite ends thereof with said bevel, and at a tail end of said outer side thereof forming one of said thickened portions serving as a magnetic pole induction area, said external excited magnetic disk provided with a hollow toothed ring for receiving therein said internal excited magnetic disk such that said wing pieces of said internal excited magnetic disk and round teeth of said hollow toothed ring of said external excited magnetic disk form north/south poles whereby said round teeth have a pointed end which is provided with a thickened portion to serve as a magnetic pole induction area.

* * * * *